C. C. TOMKINSON.
EXPANSION BOLT.
APPLICATION FILED JUNE 22, 1909.

958,783.  Patented May 24, 1910.

WITNESSES

INVENTOR
Charles C. Tomkinson

UNITED STATES PATENT OFFICE.

CHARLES C. TOMKINSON, OF PLAINFIELD, NEW JERSEY.

EXPANSION-BOLT.

958,783.     Specification of Letters Patent.     Patented May 24, 1910.

Application filed June 22, 1909. Serial No. 503,651.

*To all whom it may concern:*

Be it known that I, CHARLES C. TOMKINSON, a citizen of the United States, and a resident of Plainfield, New Jersey, have invented certain new and useful Improvements in Expansion-Bolts, of which the following is a specification accompanied by drawings.

This invention relates to an expansion bolt particularly adapted for fastening electric fixtures and other devices, in which it is necessary that provision be made for the connection of electric wires or other connectors.

The object of this invention is to enable the electric wires or other connectors to be carried through the expansion bolt itself instead of being led to the electric or other fixture at one side of the bolt, as at present In fastening an electric fixture, as an electric light socket, for instance, to a wall or ceiling construction, the electric conduits for the wires are led into the wall or ceiling alongside of the fixture and its fastening and the ends of the wires are connected into the socket, usually at the sides of the socket. According to this present construction the ends of the wires often become exposed and trouble is experienced in maintaining the circuit complete. Furthermore, it is customary to provide a cap or cover for the wires where they enter the socket.

According to my improved construction, the circuit wires are carried through the interior of the expansion bolt itself, thus protecting the wires and cheapening the cost of installation of fixtures.

To these ends the invention consists of the expansion bolt substantially as hereinafter fully described and claimed in this specification and shown in the accompanying drawings, in which—

Figure 1:
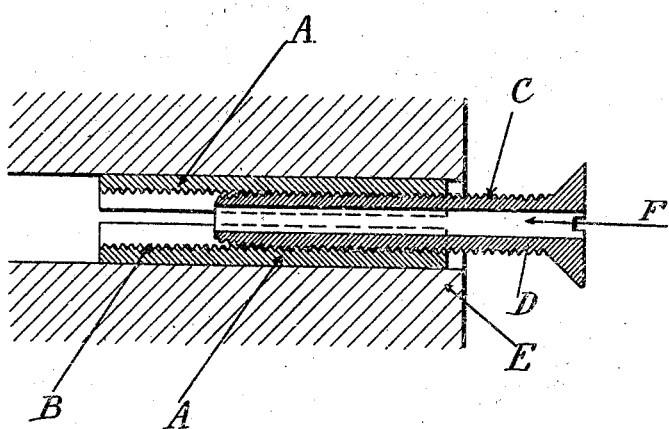
Figure 2:
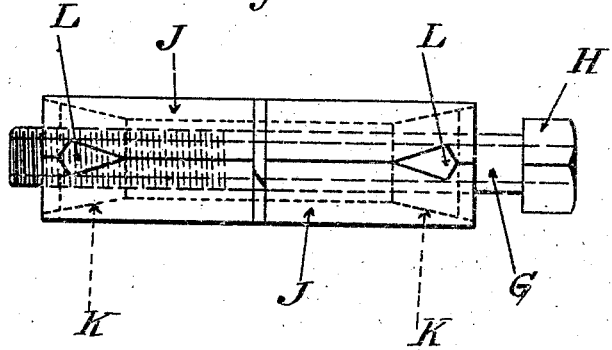

Figure 1 is a longitudinal sectional view of one form of expansion bolt embodying the invention; and Fig. 2 is a side view of another form of the invention.

The expansible shield is preferably in the form of a plurality of sections, in this instance the shield sections A, A being longitudinally divided, and in Fig. 1 shown as provided with interior screw threads B adapted to coöperate with the exterior threads C on the stem or expanding member D. The wall or ceiling construction is represented at E into which the bolt is thrust and expanded therein. In Fig. 1 a simple form of an expansion bolt is shown in which the stem D is in the form of a screw bolt, but the invention is not limited to any particular form of expansion bolt or bolt anchor. In order that wires or other connectors may be led through the expansion bolt, I construct the stem or bolt D hollow in form, and provided with a longitudinal passage-way F. The wires may be led through this hollow interior F and connected to the electric light fixture or socket. The expansion bolt may be removed and replaced or tightened and adjusted without interfering with the wires and the wires are at all times protected and concealed from view, thus avoiding the necessity of an additional protective casing or cap at the places where the wires would otherwise be exposed. The electric fixture or socket may be carried on the outer end of the bolt or stem D or connected thereto in any suitable manner.

In Fig. 2, another form of the invention is shown in which the stem or bolt G is hollow as before and is provided with a head H. This stem does not directly expand the shield sections J but causes the expansion through the agency of the tapered heads or nuts K which are preferably provided with the wedge shaped wings L.

In both constructions the wires may be led through the interior of the expanding member D or G.

I claim and desire to obtain by Letters Patent the following:

1. In an expansion bolt, the combination of an expansible interiorly screw threaded shield, and a hollow exteriorly screw threaded expanding member, extending longitudinally through said shield.

2. In an expansion bolt, the combination of a longitudinally divided interiorly screw threaded expansible shield, and a hollow exteriorly screw threaded stem extending longitudinally therethrough for expanding said shield.

In testimony whereof I have signed this specification in the presence of two subscribing witnesses.

CHARLES C. TOMKINSON.

Witnesses:
    E. W. SWARTWOUT,
    STEPHEN MORRIN.